US011381335B2

(12) United States Patent
Chang (10) Patent No.: US 11,381,335 B2
(45) Date of Patent: Jul. 5, 2022

(54) METHOD AND APPARATUS FOR SPECTRUM DEFRAGMENTATION, DEVICE, AND SYSTEM

(71) Applicant: Huawei Technologies Co., Ltd., Shenzhen (CN)

(72) Inventor: Tianhai Chang, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/716,060

(22) Filed: Dec. 16, 2019

(65) Prior Publication Data

US 2020/0186273 A1 Jun. 11, 2020

Related U.S. Application Data

(63) Continuation of application No. PCT/CN2018/081340, filed on Mar. 30, 2018.

(30) Foreign Application Priority Data

Jun. 15, 2017 (CN) .......................... 201710453529.2

(51) Int. Cl.
*H04J 14/02* (2006.01)
*H04B 10/25* (2013.01)
(Continued)

(52) U.S. Cl.
CPC .......... *H04J 14/0212* (2013.01); *H04B 10/25* (2013.01); *H04W 16/02* (2013.01); *H04W 36/0083* (2013.01)

(58) Field of Classification Search
CPC .................................................. H04J 14/0227
See application file for complete search history.

(56) References Cited

U.S. PATENT DOCUMENTS 9,020,350 B2 4/2015 Sullivan et al.
2002/0176356 A1* 11/2002 Courtney ............ H04J 14/0241
370/216
(Continued)

FOREIGN PATENT DOCUMENTS

CN 101242354 A 8/2008
CN 101931881 A 12/2010
(Continued)

OTHER PUBLICATIONS

S. Ba et al., "Defragmentation Scheme Based on Exchanging Primary and Backup Paths in 1+1 Path Protected Elastic Optical Networks", IEEE/ACM Transaction on Networking, vol. 25, No. 3, Date of Publication: Jan. 27, 2017 (Year: 2017).*

(Continued)

*Primary Examiner* — Shi K Li
(74) *Attorney, Agent, or Firm* — Conley Rose, P.C.

(57) ABSTRACT

A method and an apparatus for spectrum defragmentation, where the method includes: obtaining, by a transmit end, a target data stream; sending the target data stream on one line using a to-be-adjusted frequency band; adjusting, on another line, an occupied frequency band of the target data stream from the to-be-adjusted frequency band to a target frequency band; switching the target data stream to the other line; and transmitting the target data stream using the target frequency band.

20 Claims, 7 Drawing Sheets

(51) Int. Cl.
*H04W 16/02* (2009.01)
*H04W 36/00* (2009.01)

(56) References Cited

U.S. PATENT DOCUMENTS

| | | | |
|---|---|---|---|
| 2012/0321296 | A1 | 12/2012 | Wellbrock et al. |
| 2013/0142509 | A1* | 6/2013 | Connolly ............... H04J 3/1652 398/44 |
| 2013/0195460 | A1 | 8/2013 | Kadohata et al. |
| 2013/0251368 | A1 | 9/2013 | Kim et al. |
| 2014/0186020 | A1 | 7/2014 | Handelman |
| 2015/0016262 | A1* | 1/2015 | Friskney ............... H04L 45/54 370/235 |
| 2015/0172097 | A1* | 6/2015 | Melman ............... H04L 43/10 370/225 |
| 2015/0295673 | A1 | 10/2015 | Zhang et al. |
| 2016/0043852 | A1 | 2/2016 | Su et al. |
| 2016/0094306 | A1 | 3/2016 | Nakajima et al. |
| 2016/0352452 | A1 | 12/2016 | Takeshita et al. |
| 2018/0191431 | A1* | 7/2018 | Moision ............... H04L 1/187 |

FOREIGN PATENT DOCUMENTS

| | | |
|---|---|---|
| CN | 102420656 A | 4/2012 |
| CN | 102724113 A | 10/2012 |
| CN | 103155460 A | 6/2013 |
| CN | 103220796 A | 7/2013 |
| CN | 103547338 A | 1/2014 |
| CN | 104661119 A | 5/2015 |
| CN | 105391669 A | 3/2016 |

OTHER PUBLICATIONS

Ba, S., et al., "Defragmentation Scheme Based on Exchanging Primary and Backup Paths in 1+1 Path Protected Elastic Optical Networks," IEEE/ACM Transactions on Networking, vol. 25, No. 3, XP011653058, Jun. 1, 2017, pp. 1717-1731.
Wang, C., et al., "Protection Path-based Hitless Spectrum Defragmentation in Elastic Optical Networks: Shared Backup Path Protection," Mar. 22, 2015, XP032784447, 3 pages.
Machine Translation and Abstract of Chinese Publication No. CN102420656, Apr. 18, 2012, 15 pages.
Machine Translation and Abstract of Chinese Publication No. CN102724113, Oct. 10, 2012, 7 pages.
Machine Translation and Abstract of Chinese Publication No. CN104661119, May 27, 2015, 14 pages.
Machine Translation and Abstract of Chinese Publication No. CN105391669, Mar. 9, 2016, 11 pages.
Series G: Transmission Systems and Media, Digital Systems and Networks, Digital terminal equipments—General, Series Y: Global Information Infrastructure, Internet Protocol Aspects, Next-Generation Networks, Internet of Things and Smart Cities, Internet protocol aspects—Transport, Interfaces for the optical transport network, Amendment 1, G.709/Y.1331, Amendment 1, Nov. 2016, 250 pages.

* cited by examiner

METHOD AND APPARATUS FOR SPECTRUM DEFRAGMENTATION, DEVICE, AND SYSTEM

CROSS-REFERENCE TO RELATED APPLICATIONS

This application is a continuation of International Patent Application No. PCT/CN2018/081340, filed on Mar. 30, 2018, which claims priority to Chinese Patent Application No. 201710453529.2, filed on Jun. 15, 2017. The disclosures of the aforementioned applications are hereby incorporated by reference in their entireties.

TECHNICAL FIELD

This disclosure relates to the field of optical transmission, and in particular, to a method and an apparatus for spectrum defragmentation, a device, and a system.

BACKGROUND

With continuous development of network communications technologies, optical transmission has become an important data transmission mode, and data transmission may be performed in an optical signal form between a data transmitter and a data receiver. The optical transmission mainly uses a wavelength division multiplexing technology, and a plurality of data streams can be transmitted in a same optical fiber using optical waves of different wavelengths.

In the current optical transmission field, an elastic optical network technology is introduced, that is, a spectrum of an optical fiber is spread from a conventional fixed spectrum grid to an elastic spectrum grid with a smaller granularity. To be more specific, a frequency band bandwidth occupied by each elastic spectrum grid is slot=12.5 GHz (for each elastic spectrum grid, a center frequency is 193.1 THz+n×slot/2, and a bandwidth is m×slot). In this way, data transmission may be implemented using a plurality of contiguous elastic spectrum grids. If a data stream needs to occupy a frequency band with a bandwidth of 50 GHz, the foregoing four contiguous elastic spectrum grids may be used for transmission.

The foregoing technology has at least the following problem.

When a data stream is transmitted between different nodes of an optical path, optical waves of a same wavelength need to be used. However, because of randomness of a transmission service of each node, allocation of spectrum resources by the node is also relatively disordered, and a large quantity of the spectrum resources often cannot be utilized. For example, among three transmission nodes including A, B, and C, there are two optical paths whose wavelengths are $\lambda_1$ and $\lambda_2$, where is used to transmit a data stream 1 between A and B, and $\lambda_2$ is used to transmit a data stream 2 between B and C. In this case, when a data stream 3 needs to be transmitted from A to C through B, transmission of the data stream 3 cannot be completed, although there are excess spectrum resources among A, B, and C. Therefore, utilization of the spectrum resource is relatively low.

SUMMARY

To resolve the foregoing technical problem, embodiments of this disclosure provide a method and an apparatus for spectrum defragmentation and a system. The technical solutions are as follows.

According to a first aspect, a method for spectrum defragmentation is provided. The method includes: obtaining, by a transmit end, a target data stream, where the target data stream carries a sequence identifier used to indicate a transmission sequence of a data unit; sending, on a second line, the target data stream using an initial transmission frequency band of the target data stream; switching the target data stream to a first line; and sending the target data stream using a target frequency band.

In the solution shown in this embodiment of this disclosure, in a process of spectrum defragmentation, the transmit end may transmit the target data stream using the initial transmission frequency band on one line, and perform spectrum migration on another line at the same time. In this way, a spectrum of the target data stream is adjusted, and continuity of transmission of the target data stream is ensured.

In a possible implementation, the transmit end may first send the target data stream using the first line, and then switch the target data stream to the second line for sending.

In the solution shown in this embodiment of this disclosure, in a process of spectrum defragmentation, the transmit end may first send the target data stream using the first line. The transmit end then performs frequency band migration of the target data stream on the first line, continuously transmits the target data stream using the second line at the same time, and then continuously transmits the target data stream using the first line after a frequency band of the target data stream is adjusted on the first line. In this way, spectrum defragmentation of the first line may be completed without interrupting sending of the target data stream by introducing the second line.

In a possible implementation, in a scenario, the first line may be an initial transmission line of the target data stream, and the second line may be a pre-configured standby transmission line. In another scenario, the first line may be a pre-configured standby transmission line, and the second line may be an initial transmission line of the target data stream.

In a possible implementation, before spectrum defragmentation of a transmission line is performed, the transmit end may pre-determine a data transmission parameter of the transmission line, and then configure a data transmission parameter of a standby transmission line to be the same as at least one of data transmission parameters of a to-be-defragmented transmission line.

In the solution shown in this embodiment of this disclosure, at least one standby transmission line may be preset between the transmit end and a receive end to assist in spectrum defragmentation of another transmission line. At least one standby transmission line may serve spectrum defragmentation of a plurality of transmission lines. When spectrum defragmentation needs to be performed on a transmission line, a data transmission parameter of a standby transmission line may be directly configured.

In a possible implementation, while sending the target data stream on the second line, the transmit end may also send the target data stream on the first line.

In the solution shown in this embodiment of this disclosure, the transmit end may transmit the target data stream using both the first line and the second line. The receive end may selectively receive one data stream from two data streams, and then temporarily store the other transmitted data stream. In this way, when switching the line to receive the target data stream, the receive end may continuously receive a subsequent data unit of the target data stream based on a temporarily stored data unit, thereby ensuring lossless data receiving.

According to a second aspect, a method for spectrum defragmentation is provided, where the method includes: first receiving, on a second line by a receive end, a target data stream using a to-be-adjusted frequency band, where the target data stream carries a sequence identifier used to indicate a transmission sequence of a data unit; then switching the target data stream to a first line to receive the target data stream; and receiving the target data stream using a target frequency band.

In the solution shown in this embodiment of this disclosure, in a process of spectrum defragmentation, the receive end may receive the target data stream using an initial transmission frequency hand on one line, and perform spectrum migration of the target data stream on another line at the same time. In this way, a spectrum of the target data stream is adjusted, and continuity of transmission of the target data stream is ensured.

In a possible implementation, the receive end may first receive the target data stream using the first line, then switch the target data stream to the second line, and receive the target data stream using the to-be-adjusted frequency band.

In the solution shown in this embodiment of this disclosure, in a process of spectrum defragmentation, the receive end may first receive the target data stream using the first line, then perform frequency band migration of the target data stream on the first line and continuously receive the target data stream using the second line at the same time, and then continuously receive the target data stream using the first line after a frequency band of the target data stream is adjusted on the first line. In this way, the spectrum defragmentation of the first line may be completed without interrupting receiving of the target data stream by introducing the second line.

In a possible implementation, in a scenario, the first line may be an initial transmission line of the target data stream, and the second line may be a pre-configured standby transmission line. In another scenario, the first line may be a pre-configured standby transmission line, and the second line may be an initial transmission line of the target data stream.

In a possible implementation, when switching the line to receive the target data stream, the receive end may first determine a sequence identifier of a most recently received data unit before switching, and continuously receive a data unit after the sequence identifier after switching.

In the solution shown in this embodiment of this disclosure, the receive end may determine a received data unit based on the sequence identifier carried in the target data stream, and then, when switching the line to receive the target data stream, determine, using the sequence identifier, a data unit that needs to be continuously received, such that lossless data receiving can be implemented in a line switching process.

In a possible implementation, while receiving the target data stream transmitted on the second line, the receive end may further temporarily store the target data stream transmitted on the first line.

In the solution shown in this embodiment of this disclosure, the transmit end may transmit the target data stream using both the first line and the second line. The receive end may selectively receive one data stream from two data streams, and then temporarily store the other transmitted data stream. In this way, when switching the line to receive the target data stream, the receive end may continuously receive a subsequent data unit of the target data stream based on a temporarily stored data unit, thereby ensuring lossless data receiving.

According to a third aspect, a transmit end is provided. The transmit end includes a transceiver and a processor. The processor implements, by executing an instruction, the method for spectrum defragmentation provided in the first aspect.

According to a fourth aspect, a receive end is provided. The receive end includes a transceiver and a processor. The processor implements, by executing an instruction, the method for spectrum defragmentation provided in the second aspect.

According to a fifth aspect, an apparatus for spectrum defragmentation is provided. The apparatus includes at least one module, and the at least one module is configured to implement the method for spectrum defragmentation provided in the first aspect.

According to a sixth aspect, an apparatus for spectrum defragmentation is provided. The apparatus includes at least one module, and the at least one module is configured to implement the method for spectrum defragmentation provided in the second aspect.

According to a seventh aspect, a computer program product that includes instructions is provided, and when the instructions are executed by a transmit end, the transmit end is enabled to perform the method for spectrum defragmentation provided in the first aspect.

According to an eighth aspect, a computer program product that includes instructions is provided, and when the instructions are executed by a receive end, the receive end is enabled to perform the method for spectrum defragmentation provided in the second aspect.

According to a ninth aspect, a data transmission system is provided. The system includes a transmit end, for example, the transmit end according to the third aspect, and a receive end, for example, the receive end according to the fourth aspect.

The technical solutions provided in the embodiments of this disclosure have the following beneficial effects.

In this embodiment of this disclosure, in a process of spectrum defragmentation, the transmit end may first transmit a target data stream using a to-be-adjusted frequency band of a second line. After the spectrum defragmentation is started, the transmit end switches the target data stream to a first line, and sends the target data stream using a target frequency band. Correspondingly, a receive end may first receive the target data stream using the to-be-adjusted frequency band of the second line, and receive, after the spectrum defragmentation is started, the target data stream using a target frequency band of the first line. In this way, a data stream is transmitted on one line, and a frequency band occupied by the data stream is adjusted on another line at the same time; and then the data stream is transmitted using an adjusted frequency band, such that migration of a frequency band of the target data stream can be implemented to achieve a purpose of spectrum defragmentation, thereby increasing utilization of a spectrum resource. In addition, because a sequence identifier is used during line switching, data of the target data stream is lossless in a transmission process.

DESCRIPTION OF EMBODIMENTS

To make the objectives, technical solutions, and advantages of this disclosure clearer, the following further describes the implementations of this disclosure in detail with reference to the accompanying drawings.

Terms such as "component", "module", and "system" used in this application are used to indicate computer-related entities. The computer-related entities may be hardware, firmware, combinations of hardware and software, software, or running software. For example, a component may be, but is not limited to, a process that is run on a processor, a processor, an object, an executable file, a thread of execution, a program, and/or a computer. As an example, both a computing device and an application that is run on the computing device may be components. One or more components may reside within a process and/or a thread of execution, and a component may be located on one computer and/or distributed between two computers or among more computers. In addition, these components may be executed from various computer-readable media that have various data structures. These components may communicate using a local and/or remote process and according to, for example, a signal having one or more data packets (for example, data from one component that interacts with another component in a local system or a distributed system, and/or interacts with another system via a network such as the Internet using a signal).

Figure 1:
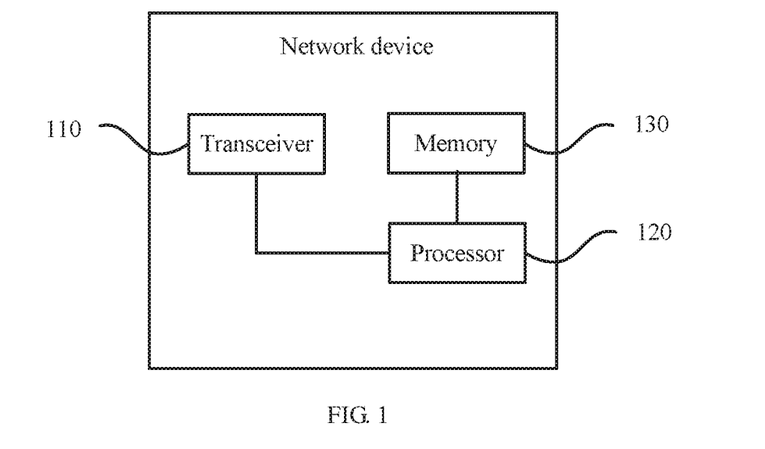
FIG. 1 is a schematic structural diagram of a network device according to an embodiment of this application.

An embodiment of this disclosure provides a method for spectrum defragmentation, and the method is performed by a network device. The network device can be configured to transmit a data stream through an optical fiber. The network device may include a transmit end and a receive end, which are configured to send the data stream and receive the data stream, respectively. The network device may be a server supporting a data transmission service, or may be a central management device of a network device group providing a data transmission service. The network device may be provided with a plurality of data transmission ports, and can transmit data with a client or another network device using the data transmission ports. The network device may include a transceiver 110, a processor 120, and a memory 130. The transceiver 110 and the memory 130 may be separately connected to the processor 120. As shown in FIG. 1, the connection manner in the figure is merely an example.

Alternatively, the network device may be similar to a device in a general-purpose computer architecture, and the processor, the memory, and the transceiver are connected using a bus. This is not limited in this embodiment of this disclosure. The transceiver 110 may be configured to receive or send a message and a data stream. The transceiver 110 may include but is not limited to at least one amplifier, a tuner, one or more oscillators, a coupler, a Low Noise Amplifier (LNA), a duplexer, and the like. The memory 130 may be configured to store data that is locally generated or sent by a client in a process of spectrum defragmentation. The processor 120 may be a control center of the network device, and is connected to all parts, such as the transceiver 110 and the memory 130, of the network device using various interfaces and lines. Optionally, the processor may include one or more processing units. Optionally, the processor 120 may integrate an application processor and a modem processor, where the application processor mainly processes an operating system, and the modem processor mainly processes wireless communication. The processor 120 may alternatively be a digital signal processor, an application-specific integrated circuit, a field programmable gate array, another programmable logic device, or the like. The processor 120 may be a general purpose processor, such as a central processing unit (CPU) and a network processor (NP). Alternatively, the processor 120 may be a digital signal processor (DSP), an application-specific integrated circuit (ASIC), a field programmable gate array (FPGA), another programmable logic device, or the like. For example, a program may include program code, and the program code includes a computer operation instruction.

A format of data transmission is not limited in this application, and data may be encapsulated into an optical channel data unit (ODU) frame for transmission, or may be transmitted based on a format such as a packet. In this embodiment, an example in which the data transmission unit is an ODU frame is used for description. Other cases are similar to this, and are not further described. Additional explanations will be made where necessary.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, the word "example" in the embodiments of this application is used to represent giving an example, an illustration, or a description. Any embodiment or design solution described as an "example" in this application should not be explained as being more preferred or having more advantages than another embodiment or design solution. Further, "for example" is used to present a concept in an example manner.

The network architecture and the service scenario described in the embodiments of this application are intended to describe the technical solutions in the embodiments of this application more clearly, and do not constitute a limitation on the technical solutions provided in the embodiments of this application. A person of ordinary skill in the art should appreciate that with the evolution of the network architecture and the emergence of new service scenarios, the technical solutions provided in the embodiments of this application are also applicable to similar technical problems.

Figure 2A:
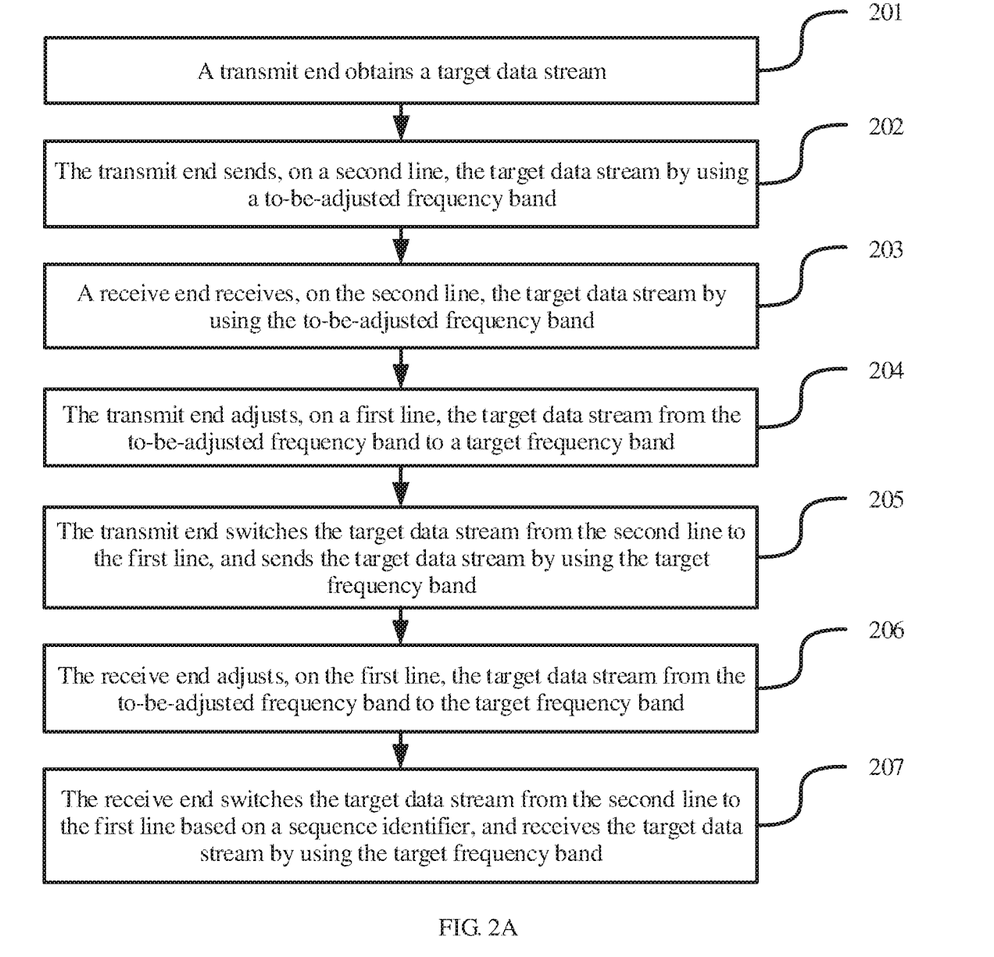
FIG. 2A is a schematic flowchart of a method for spectrum defragmentation according to an embodiment of this application.

With reference to an implementation, the following describes a process of spectrum defragmentation shown in FIG. 2, and content may be as follows.

Step 201: A transmit end obtains a target data stream.

The target data stream carries a sequence identifier, and the sequence identifier is used to indicate a transmission sequence of a data unit of the target data stream.

In implementation, each network device is configured to support data transmission services of all clients in an area corresponding to the network device. When a client needs to send a data stream, the client may first upload the data stream to the network device of the client, and then the network device determines a transmission destination of the data stream, and allocates a transmission path, a transmission port, and the like to the data stream based on the transmission destination. For example, when a client a in an area A needs to transmit a data stream to a client b in an area B, a network device 1 that manages the area A may receive the data stream uploaded by the client a, and then select, from all transmission paths from the network device 1 to a network device 2 that manages the area B, an available transmission path to transmit the data stream. Herein, a determining manner may be as follows. The network device 1 first acquires a transmission bandwidth requirement of the data stream, and then selects, from all the transmission paths to the network device 2, a frequency band that meets the foregoing transmission bandwidth requirement, to determine a transmission line that belongs to the frequency band.

FIG. 2A shows a schematic diagram of a system for spectrum defragmentation. A network device (including a transmit end and a receive end) may include a plurality of tributary boards, cross-connect boards, and a plurality of line boards. Each tributary board corresponds to a receive port of a data stream. The network device may receive, using the tributary boards, a data stream sent by a client or another network device. Each line board corresponds to a transmit port of a data stream. The network device may send, using different line boards, data streams to different destination addresses corresponding to the different line boards. The tributary boards are configured to complete mapping/demapping of a data packet to a low-order ODU. The cross-connect boards are configured to complete a cross scheduling of the low-order ODU. The line boards are configured to complete one or more functions, such as multiplexing/demultiplexing from a low-order ODU to a high-order ODU, framing/deframing of an optical channel transport unit (OTU), modulation/demodulation, and wavelength division multiplexing/demultiplexing. The functions of modulation/demodulation and wavelength division multiplexing of the line boards can be used to adjust a wavelength and a spectrum of an optical channel. This application does not limit that the functions of multiplexing/demultiplexing from a low-order ODU to a high-order ODU, framing/deframing of an OTU, modulation/demodulation, and wavelength division multiplexing/demultiplexing need to be implemented on a same physical board. The foregoing functions of the line boards may alternatively be implemented by a plurality of physical cards or in a network device, to jointly implement the functions of the line boards in this disclosure. Some of the foregoing functions of the line boards are optional, for example, the function of multiplexing/demultiplexing from a low-order ODU to a high-order ODU is optional. Similarly, the tributary boards, the cross-connect boards, and the line boards may belong to a plurality of network devices in a network device group.

Further, because optical waves of a same wavelength need to be used when a data stream is transmitted between different nodes (namely, network devices) of a transmission line, the foregoing selected transmission line needs to have a same unoccupied frequency band meeting transmission bandwidth requirement of the data stream between every two nodes at the same time. To avoid that no frequency band is available between the transmit end and the receive end when the data stream is sent, the network device needs to defragment spectrum resources in a transmission path. Herein, there are a plurality of manners of triggering the network device to defragment the spectrum resources. The following briefly describes several feasible triggering manners.

Manner 1: The network device may periodically and automatically detect the spectrum resources in the transmission line. If a disordering degree of the spectrum resources meets a preset condition, the spectrum resources in the transmission line may be automatically defragmented.

Manner 2: Technical personnel in an entire data transmission system may detect the spectrum resources in the transmission line autonomously, and manually determine whether the spectrum resources need to be defragmented. If the spectrum resources need to be defragmented, a defragmentation instruction for the spectrum resources is sent to the network device by a management device.

Manner 3: When a network device needs to transmit a data stream, if no frequency band is available in the transmission line, a defragmentation processing of the spectrum resources may be automatically triggered. Certainly, if no frequency band is available, distribution and a quantity of spectrum fragments may be further detected, and then, whether to defragment the spectrum resources may be determined based on a detection result.

For example, the spectrum resource defragmentation on a transmission line requires reallocation of a frequency band occupied by some or all data streams in the transmission line. Therefore, the spectrum resource defragmentation is essentially to adjust the frequency band occupied by the data streams being transmitted. Therefore, after determining that spectrum resources of a transmission line need to be defragmented, the transmit end may first determine a frequency band that needs to be defragmented on the transmission line, and then perform frequency band migration on data streams that are being transmitted on the frequency band one by one. In this way, after determining to defragment the spectrum resources, the transmit end may obtain a target data stream transmitted using a to-be-adjusted frequency band. Herein, the target data stream may be directly uploaded by a client to the network device, or may be forwarded by another network device to the network device. In addition, the target data stream may carry a sequence identifier used to indicate a transmission sequence of a data unit. When the network device sends the target data stream after receiving the target data stream, the sequence identifier may be added by the network device. The sequence identifier may alternatively be added by the client or the other network device in advance.

With reference to the schematic structural diagram of the foregoing network device, the network device may receive a packet service or a constant bit rate (CBR) service using the tributary boards, then parses out service data, and encapsulate the service data into a low-order ODU frame structure. The foregoing packet service includes an Ethernet packet service, a flexible Ethernet (FlexE) packet service, a multi-protocol label switching (MPLS) packet service, an Internet Protocol (IP), and the like. The CBR service includes a synchronous digital hierarchy (SDH) service, an optical transport network (OTN) service, a common public radio interface (CPRI) service, or another time division multiplexing (TDM) service. This application does not limit a specific method for parsing the service data and a specific method for encapsulating the service into the low-order ODU frame structure. A mapping scheme, such as a generic framing procedure (GFP), a generic mapping procedure (GMP), an asynchronous mapping procedure (AMP), and a bit synchronous mapping procedure (BMP) may be used, based on different services, to encapsulate the service into the low-order ODU frame structure. Then, the network device may add overheads to the foregoing low-order ODU frame. The added overheads include a sequence identifier for indicating a sequence of the low-order ODU frames. In addition, if data of the target data stream is directly encapsulated based on a packet format, rather than being encapsulated using a low-order ODU format, the sequence identifier can be directly added to the packet.

Step 202: The transmit end sends, on a second line, the target data stream using a to-be-adjusted frequency band.

In implementation, after obtaining the target data stream, the transmit end may determine a predetermined transmission frequency band (namely, the to-be-adjusted frequency band) of the target data stream, and then send, using a line board corresponding to the second line, the target data stream to the receive end using the to-be-adjusted frequency band.

Step 203: The receive end receives, on the second line, the target data stream using the to-be-adjusted frequency band.

In implementation, after the transmit end sends, on the second line, the target data stream using the to-be-adjusted frequency band, the receive end may receive, on the second line, the target data stream using the to-be-adjusted frequency band. Using OTU1 transmission as an example, with reference to the schematic structural diagram of the foregoing network device, the receive end receives the target data stream using the line board corresponding to the second line, parses the target data stream, performs OTU deframing and demultiplexing to obtain a low-order ODU frame, and then may parse a structure of the low-order ODU frame to restore service data.

Step 204: The transmit end adjusts, on a first line, the target data stream from the to-be-adjusted frequency band to a target frequency band.

Figure 2B:
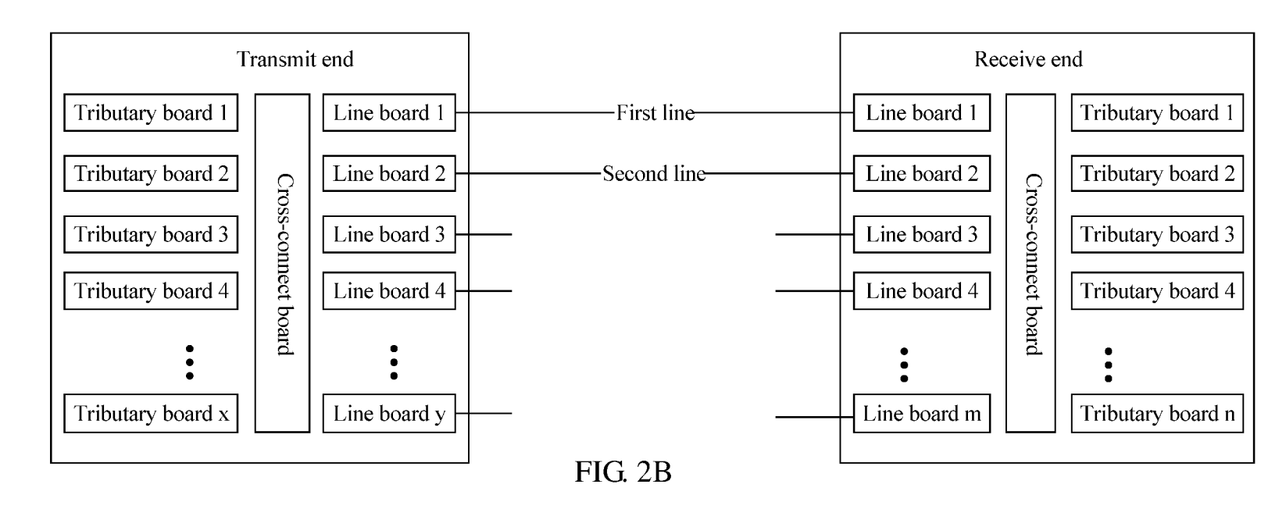
FIG. 2B is a schematic diagram of a system framework for spectrum defragmentation according to an embodiment of this application.
Figure 2C:
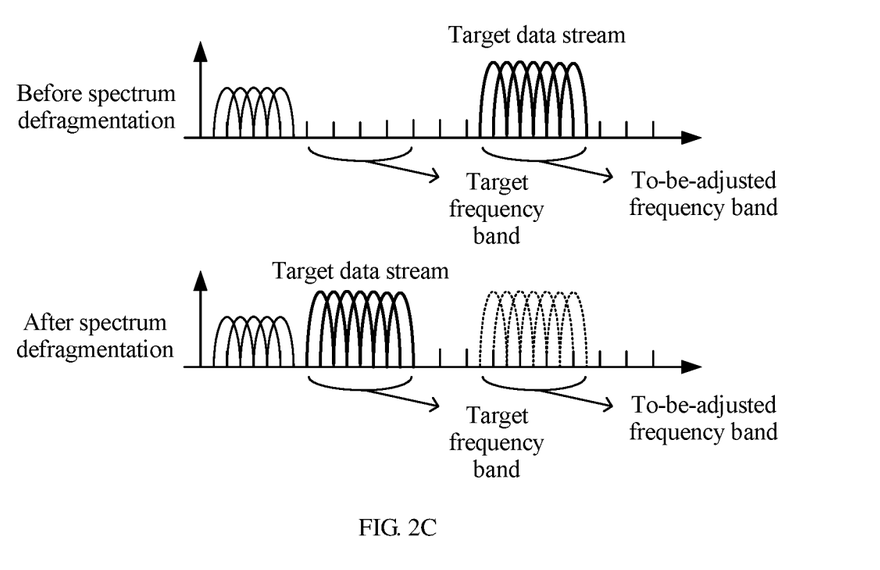
FIG. 2C is a schematic diagram of an effect of spectrum defragmentation according to an embodiment of this application.

In implementation, after obtaining the target data stream, the transmit end may adjust on the first line a transmission frequency band of the target data stream from the to-be-adjusted frequency band to the target frequency band, as shown in FIG. 2B. An example of processing may be modulating the target data stream to a carrier corresponding to the target frequency band on the first line for transmission. It is not difficult to understand that both the first line and the foregoing second line are transmission lines that are established in advance and are connected to a same transmit end and a same receive end, and the transmit end and the receive end may transmit a data stream using the first line and/or the second line.

Step 205: The transmit end switches the target data stream from the second line to the first line, and sends the target data stream using the target frequency band.

In implementation, after adjusting, on the first line, the target data stream to the target frequency band, the transmit end may stop transmitting the target data stream on the second line, then switches the target data stream to the first line for transmission, and may send the target data stream to the receive end by using the target frequency band. It should be noted that, to ensure continuity and integrity of the service data, no data unit should be omitted in a process of switching the target data stream to the first line for transmission. For example, when sending of the target data stream is stopped, a sequence identifier X of a data unit that is finally sent may be recorded, and then the target data stream is sent from a data unit whose sequence identifier is less than or equal to X+1 on the first line.

Step 206: The receive end adjusts, on the first line, the target data stream from the to-be-adjusted frequency band to the target frequency band.

In implementation, the receive end may adjust on the first line a receive frequency band of the target data stream from the to-be-adjusted frequency band to the target frequency band. The processing in this step may be performed after the receive end receives a spectrum defragmentation instruction sent by a management device of the entire data transmission system, may be triggered after the receive end detects the transmission frequency hand of the target data stream, or may be triggered after the transmit end completes step 204 and sends a related message.

Step 207: The receive end switches the target data stream from the second line to the first line based on the sequence identifier, and receives the target data stream using the target frequency band.

In implementation, after adjusting, on the first line, the target data stream from the to-be-adjusted frequency band to the target frequency band, the receive end may switch the target data stream from the second line to the first line, and continuously receive, based on the sequence identifier carried by the target data stream, the target data stream using the target frequency band of the first line.

Optionally, to ensure integrity of received service data, before the receive end switches the line to continuously receive the target data stream, a to-be-received data unit needs to be determined. Correspondingly, the processing in step 207 may be as follows: Determining a first sequence identifier of a most recently received data unit of the target data stream; switching the target data stream from the second line to the first line; and receiving a data unit, whose sequence identifier is a second sequence identifier, of the target data stream using the target frequency band.

The second sequence identifier is a sequence identifier after the first sequence identifier.

In implementation, when switching to the first line to receive the target data stream, the receive end may first determine the first sequence identifier of the data unit, most recently received using the second line, of the target data stream, and then switch the target data stream from the second line to the first line for receiving. Then, a data unit whose sequence identifier is a second sequence identifier (namely, a sequence identifier after the first sequence identifier) may be searched in the target data stream transmitted using the second line, and then the receive end may receive a subsequent data unit of the target data stream by starting from the data unit. For example, in an OTN transmission scenario, lossless switching is completed at a boundary of an ODU frame, and continuity of the sequence identifier of the data unit is maintained after the switching.

Optionally, to ensure integrity of the transmission of the target data stream, after obtaining the target data stream, a terminal may send the target data stream using the first line and the second line at the same time. Correspondingly, before step 204, the following processing is performed: The transmit end sends the target data stream on the first line, and the receive end temporarily stores the target data stream transmitted on the first line.

In implementation, when sending, on the second line, the target data stream using the to-be-adjusted frequency band, the transmit end may send the target data stream to the receive end using the first line at the same time. Further, the receive end may temporarily store the target data stream transmitted on the first line while receiving the target data stream transmitted on the second line. In this way, after the spectrum defragmentation is started, the processing in step 207 may be as follows: A tributary board 1 of the receive end (namely, a tributary board corresponding to the first line) compares a received data unit transmitted from the second line with a temporarily stored data unit transmitted from the first line, completes lossless switching at boundaries of the data units by reading sequence identifiers of the two data units, and maintains continuity of sequence identifiers of data after the switching.

Optionally, a quantity of target data streams is not limited in this disclosure. The transmit end may defragment spectrums of a plurality of target data streams in a transmission line at the same time. For a process of spectrum defragmentation, refer to step 201 to step 207.

In this embodiment of this disclosure, in a process of spectrum defragmentation, the transmit end may first transmit the target data stream using the to-be-adjusted frequency band of the second line; and after the spectrum defragmentation is started, the transmit end switches the target data stream to the first line, and sends the target data stream using the target frequency band. Correspondingly, the receive end may first receive the target data stream using the to-be-adjusted frequency band of the second line, and receives, after the spectrum defragmentation is started, the target data stream using the target frequency band of the first line. In this way, a data stream is transmitted on one line, and a frequency band occupied by the data stream is adjusted on another line at the same time; and then the data stream is transmitted using an adjusted frequency band, such that migration of a frequency band of the target data stream can be implemented to achieve a purpose of spectrum defragmentation, thereby increasing utilization of a spectrum resource. In addition, because a sequence identifier is used during line switching, data of the target data stream is lossless in a transmission process.

Optionally, in different transmission scenarios, specific lines corresponding to a first line and a second line are different.

Scenario 1: In a procedure shown in FIG. 3, the first line is an initial transmission line of a target data stream, and the second line is a pre-configured standby transmission line. Example content may be as follows.

Figure 3:
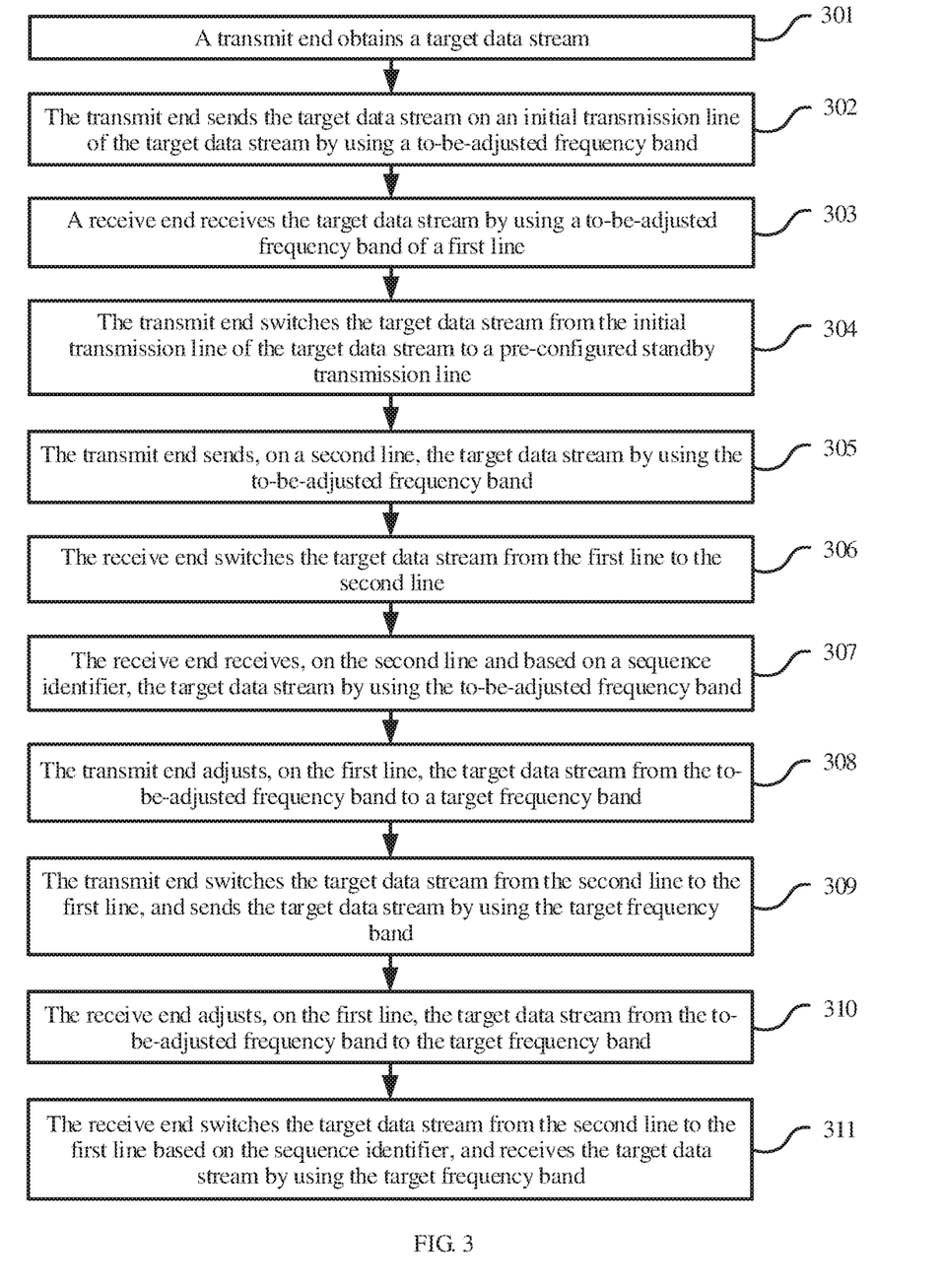
FIG. 3 is a schematic flowchart of a method for spectrum defragmentation according to an embodiment of this application.

Step 301: A transmit end obtains a target data stream.

Step 302: The transmit end sends, on an initial transmission line (namely, a first line) of the target data stream, the target data stream using a to-be-adjusted frequency band.

Step 303: A receive end receives the target data stream using the to-be-adjusted frequency band of the first line.

Step 304: The transmit end switches the target data stream from the initial transmission line of the target data stream to a pre-configured standby transmission line (namely, a second line).

Optionally, the transmit end needs to pre-configure a standby transmission line based on the initial transmission line of the target data stream. Correspondingly, before step 304, the following processing may further be included. The transmit end determines the initial transmission line of the target data stream, and configures a standby transmission line whose data transmission parameter is the same as at least one of data transmission parameters of the initial transmission line.

In implementation, a plurality of transmission lines may be established between the transmit end and the receive end. In a process of data transmission, one or more transmission lines may be selected as a standby line or standby lines, to provide an additional optical path for assisting spectrum defragmentation. To ensure that the standby line can support spectrum defragmentation of more lines, a plurality of logical resources may be configured on a line board (which may be referred to as a standby line board) of the standby line, such that the line board of the standby line becomes a line board that supports flexible configuration, for example, supporting a plurality of types of OTU line rates and supporting multiplexing and demultiplexing of a plurality of types of low-order ODU lines to OTU lines.

In this procedure, the transmit end may first determine the initial transmission line of the target data stream, and then obtain the data transmission parameters of the initial transmission line, to configure the standby transmission line, such that the data transmission parameter of the standby transmission line is the same as at least one of the data transmission parameters of the initial transmission line.

Step 305: The transmit end sends, on the second line, the target data stream using the to-be-adjusted frequency band.

Step 306: The receive end switches the target data stream first line to the second line.

Step 307: The receive end receives, on the second line and based on a sequence identifier, the target data stream using the to-be-adjusted frequency band.

Step 308: The transmit end adjusts, on the first line, the target data stream from the to-be-adjusted frequency band to a target frequency band.

Step 309: The transmit end switches the target data stream from the second line to the first line, and sends the target data stream using the target frequency band.

Step 310: The receive end adjusts, on the first line, the target data stream from the to-be-adjusted frequency band to the target frequency band.

Step 311: The receive end switches the target data stream from the second line to the first line based on the sequence identifier, and receives the target data stream using the target frequency band.

In this embodiment of this disclosure, the transmit end first transmits the target data stream using the to-be-adjusted frequency band of the initial transmission line; after the spectrum defragmentation is started, the transmit end switches the target data stream to the standby transmission line for transmission, and at the same time, adjusts, on the initial transmission line, a frequency band occupied by the target data stream to the target frequency band; and after the adjustment, the transmit end switches the target data stream to the initial transmission line for transmission. Correspondingly, the receive end may first receive the target data stream using the initial transmission line, switch to the standby transmission line to receive the target data stream after the spectrum defragmentation is started. However, after the transmit end switches to the initial transmission line again to transmit the target data stream, the receive end may receive the target data stream again using the initial transmission line. In this way, by adjusting a frequency band on the initial transmission line, and continuously transmitting the target data stream using the standby transmission line at the same time, migration of the frequency band of the target data stream may be implemented to achieve a purpose of spectrum defragmentation, thereby increasing utilization of a spectrum resource. In addition, because a sequence identifier is used during line switching, data of the target data stream is lossless in a transmission process.

Scenario 2: In a procedure shown in FIG. 4, a second line is an initial transmission line of a target data stream, and a first line is a pre-configured standby transmission line. Example content may be as follows.

Figure 4:
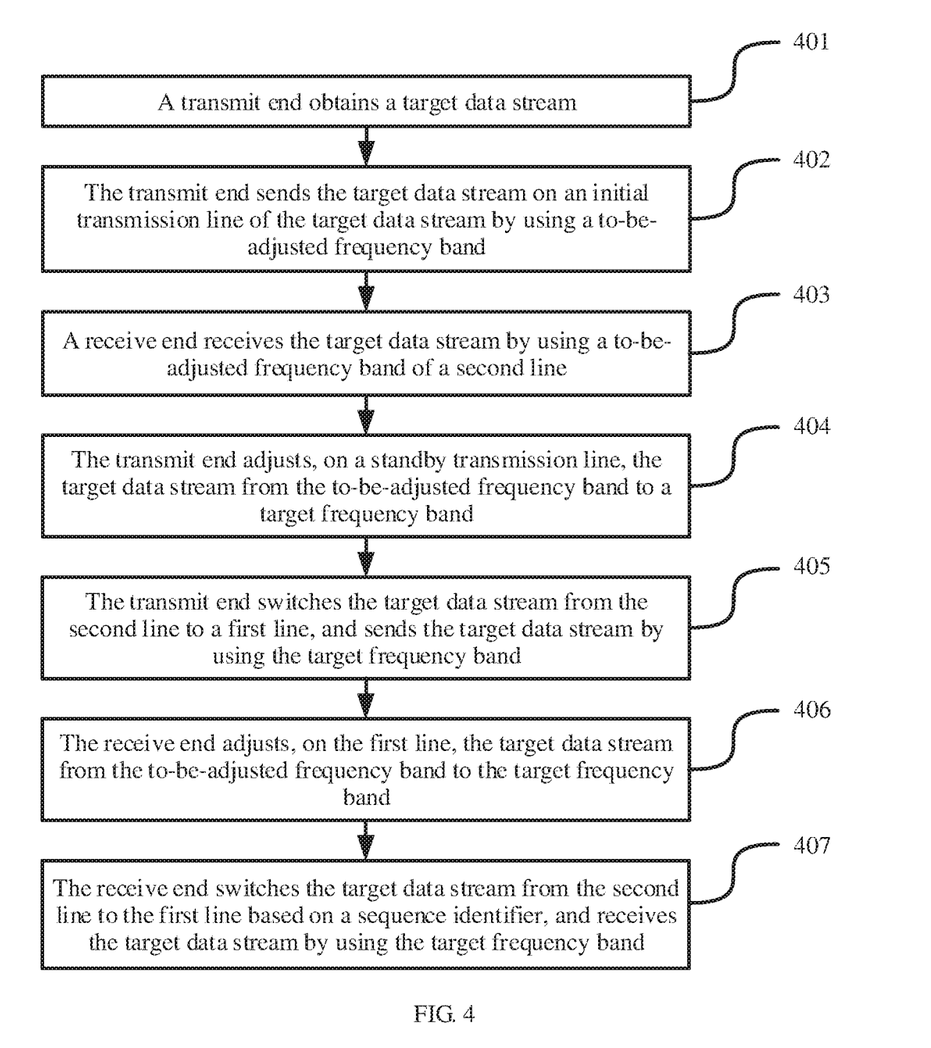
FIG. 4 is a schematic flowchart of a method for spectrum defragmentation according to an embodiment of this application.

Step 401: A transmit end obtains a target data stream.

Step 402: The transmit end sends, on an initial transmission line (namely, a second line) of the target data stream, the target data stream using a to-be-adjusted frequency band.

Step 403: The receive end receives the target data stream using the to-be-adjusted frequency band of the second line.

Step 404: The transmit end adjusts, on a standby transmission line (namely, a first line), the target data stream from the to-be-adjusted frequency band to a target frequency band.

Step 405: The transmit end switches the target data stream from the second line to the first line, and sends the target data stream using the target frequency band.

Step 406: The receive end adjusts, on the first line, the target data stream from the to-be-adjusted frequency band to the target frequency hand.

Step 407: The receive end switches the target data stream from the second line to the first line based on a sequence identifier, and receives the target data stream using the target frequency band.

In this embodiment of this disclosure, the transmit end first transmits the target data stream using the to-be-adjusted frequency band of the initial transmission line; and after spectrum defragmentation is started, the transmit end adjusts, on the standby transmission line, a frequency band occupied by the target data stream to the target frequency band, and then may switch the target data stream to the standby transmission line for transmission. Correspondingly, the receive end may first receive the target data stream using the initial transmission line, and switch, after the transmit end sends the target data stream using the target frequency band of the standby transmission line, to the standby transmission line to receive the target data stream. In this way, by transmitting the target data stream on the initial transmission line, and adjusting a frequency band occupied by the target data stream on the standby transmission line at the same time, migration of the frequency band of the target data stream may be implemented to achieve a purpose of spectrum defragmentation, thereby increasing utilization of a spectrum resource. In addition, because a sequence identifier is used during line switching, data of the target data stream is lossless in a transmission process.

Figure 5:
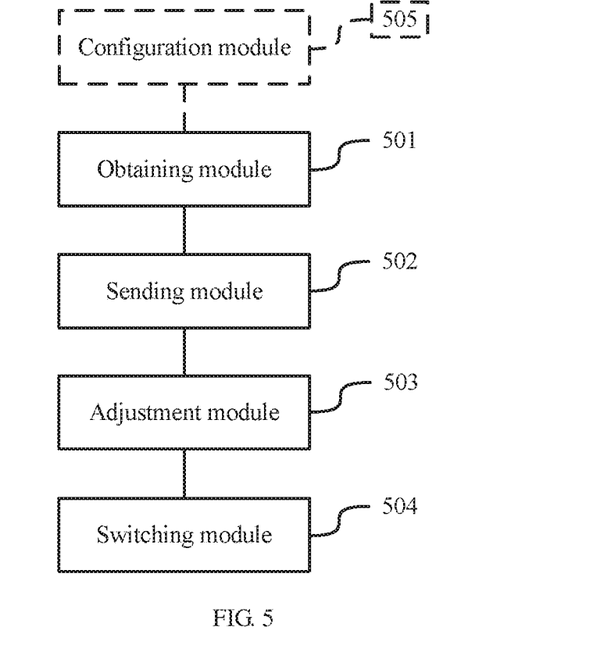
FIG. 5 is a structural block diagram of an apparatus for spectrum defragmentation according to an embodiment of this application.

FIG. 5 is a block diagram of an apparatus for spectrum defragmentation according to an embodiment of this disclosure. The apparatus may be implemented as a part of the apparatus or the entire apparatus using software, hardware, or a combination thereof. The apparatus for spectrum defragmentation according to this embodiment of this disclosure may implement the procedure described in FIG. 2 of this embodiment of this disclosure. The apparatus includes an obtaining module 501, a sending module 502, an adjustment module 503, a switching module 504, and a configuration module 505.

The obtaining module 501 is configured to obtain a target data stream, where the target data stream carries a sequence identifier, and the sequence identifier is used to indicate a transmission sequence of a data unit of the target data stream.

The sending module 502 is configured to send, on a second line, the target data stream using a to-be-adjusted frequency band.

The adjustment module 503 is configured to adjust, on a first line, the target data stream from the to-be-adjusted frequency band to a target frequency band.

The switching module 504 is configured to switch the target data stream from the second line to the first line, and send the target data stream using the target frequency band.

Optionally, the switching module 504 is further configured to switch, before the target data stream is sent on the second line using the to-be-adjusted frequency band, the target data stream from the first line to the second line.

Optionally, the first line is an initial transmission line of the target data stream, and the second line is a pre-configured standby transmission line. Alternatively, the first line is a pre-configured standby transmission line, and the second line is an initial transmission line of the target data stream.

Optionally, the apparatus further includes the configuration module 505, which is configured to determine the initial transmission line of the target data stream, and to configure a standby transmission line whose data transmission parameter is the same as at least one of data transmission parameters of the initial transmission line.

Optionally, the sending module 502 is further configured to send the target data stream on the first line before the target data stream is adjusted on the first line from the to-be-adjusted frequency band to the target frequency band.

For related details, refer to the method embodiment described in FIG. 2.

It should be noted that the foregoing obtaining module 501, adjustment module 503, and configuration module 505 may be implemented by a processor 120. The foregoing sending module 502 and switching module 504 may be implemented by a transceiver 110, or may be implemented in combination with the processor 120.

Figure 6:
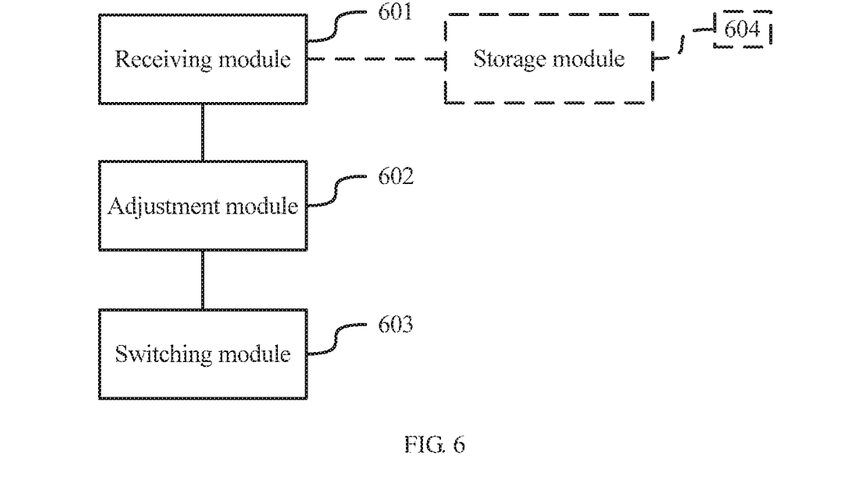
FIG. 6 is a structural block diagram of an apparatus for spectrum defragmentation according to an embodiment of this application.

FIG. 6 is a block diagram of an apparatus for spectrum defragmentation according to an embodiment of this disclosure. The apparatus may be implemented as a part of the apparatus or the entire apparatus using software, hardware, or a combination thereof. The apparatus for spectrum fragmentation according to this embodiment of this disclosure may implement the procedure described in FIG. 2 of this embodiment of this disclosure. The apparatus includes a receiving module 601, an adjustment module 602, a switching module 603, and a storage module 604.

The receiving module 601 is configured to receive, on a second line, a target data stream using a to-be-adjusted frequency band, where the target data stream carries a sequence identifier, and the sequence identifier is used to indicate a transmission sequence of a data unit of the target data stream.

The adjustment module 602 is configured to adjust, on a first line, the target data stream from the to-be-adjusted frequency band to a target frequency band.

The switching module 603 is configured to switch the target data stream from the second line to the first line based on the sequence identifier, and receive the target data stream using the target frequency band.

Optionally, the switching module 603 is further configured to switch, before the target data stream is received on the second line using the to-be-adjusted frequency band, the target data stream from the first line to the second line.

The receiving module 601 is configured to receive, on the second line and based on the sequence identifier, the target data stream using the to-be-adjusted frequency band.

Optionally, the first line is an initial transmission line of the target data stream, and the second line is a pre-configured standby transmission line. Alternatively, the first line is a pre-configured standby transmission line, and the second line is an initial transmission line of the target data stream.

Optionally, the switching module 603 is configured to: determine a first sequence identifier of a most recently received data unit of the target data stream; switch the target data stream from the second line to the first line; and receive a data unit, whose sequence identifier is a second sequence identifier, of the target data stream using the target frequency band, where the second sequence identifier is a sequence identifier after the first sequence identifier.

Optionally, the apparatus further includes the storage module 604, which is configured to temporarily store the target data stream transmitted on the first line.

For related details, refer to the method embodiment described in FIG. 2.

It should be noted that the foregoing adjustment module 602 may be implemented by a processor 120. The foregoing receiving module 601 and switching module 603 may be implemented by a transceiver 110, or may be implemented in combination with the processor 120; and the foregoing storage module 604 may be implemented by a memory 130, or may be implemented in combination with the processor 120.

In this embodiment of this disclosure, in a process of spectrum defragmentation, a transmit end may first transmit the target data stream using the to-be-adjusted frequency band of the second line; and after the spectrum defragmentation is started, the transmit end switches the target data stream to the first line, and sends the target data stream using the target frequency band. Correspondingly, a receive end may first receive the target data stream using the to-be-adjusted frequency band of the second line, and receives, after the spectrum defragmentation is started, the target data stream using the target frequency band of the first line. In this way, a data stream is transmitted on one line, and a frequency band occupied by the data stream is adjusted on another line at the same time; and then the data stream is transmitted using an adjusted frequency band, such that migration of a frequency band of the target data stream can be implemented to achieve a purpose of spectrum defragmentation, thereby increasing utilization of a spectrum resource. In addition, because a sequence identifier is used during line switching, data of the target data stream is lossless in a transmission process.

It should be noted that, during bandwidth control by the apparatus for spectrum defragmentation according to the foregoing embodiments, the division of the foregoing function modules is merely used as an example for description. In actual application, the foregoing functions may be assigned to different function modules for completion according to a requirement. That is, an internal structure of the apparatus may be divided into different function modules in order to complete all or some of the functions described above. In addition, the apparatus for spectrum defragmentation provided in the foregoing embodiments pertains to a same concept as the embodiments of the method for spectrum defragmentation. For an implementation process of the apparatus, refer to the embodiments of the method, and details are not described herein again.

All or some of the foregoing embodiments may be implemented using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the network device, the procedures or functions according to the embodiments of this disclosure are completely or partially generated. The computer instructions may be stored in a computer-readable storage medium or stay be transmitted from one computer-readable storage medium to another computer-readable storage medium. For example, the computer instructions may be transmitted from a website, computer, server, or data center to another website, computer, server, or data center in a wired (for example, a coaxial optical cable, an optical fiber, or a digital subscriber line) or wireless (for example, infrared, radio, microwave, or the like) manner. The computer-readable storage medium may be any usable medium accessible by a network device, or a data storage device, such as a server or a data center, integrating one or more usable media. The usable medium may be a magnetic medium (for example, a floppy disk, a hard disk, a magnetic tape, or the like), an optical medium (for example, a digital video disk (DVD)), or the like), or a semiconductor medium (for example, a solid-state drive, or the like).

The foregoing descriptions are merely feasible embodiments of this disclosure, but are not intended to limit this disclosure. Any modification, equivalent replacement, or improvement made without departing from the spirit and principle of this disclosure should fall within the protection scope of this disclosure.

What is claimed is:

1. A method for spectrum defragmentation, comprising:
obtaining a target data stream carrying a sequence identifier of a data unit of the target data stream, wherein the sequence identifier indicates a transmission sequence of the data unit;
sending the target data stream on a first line using a to-be-adjusted frequency band;
responsive to determining to defragment spectrum resources on the first line, switching transmission of the target stream to a second line, wherein the first line and the second line are selected from a plurality of transmission lines available to the transmit end;
adjusting, on the first line, a frequency band for the target data stream from the to-be-adjusted frequency band to a target frequency band;
switching transmission of the target data stream from the second line to the first line by using the target frequency band to transmit the target data stream on the first line;
recording a sequence identifier X of a second data unit that is last sent on the second line when the target data stream is switched from the second line to the first line;
sending, on the target frequency band of the first line, the target data stream starting from a third data unit whose sequence identifier is equal to X+1 using the target frequency band; and
using the first line or the second line to assist in spectrum defragmentation of a third line selected from the plurality of transmission lines.

2. The method according to claim 1, wherein after determining to defragment the spectrum resources on the first line, the method further comprises:
determining to defragment a first frequency band of the target stream; and
performing frequency band migration on data streams being transmitted on the first frequency band of the target data stream from the first line to the second line.

3. The method according to claim 1, wherein the first line is an initial transmission line of the target data stream and the second line is a standby transmission line, or vice versa.

4. The method according to claim 3, further comprising configuring the standby transmission line to have at least one data transmission parameter that is the same as that of the initial transmission line.

5. The method according to claim 3, further comprising configuring a plurality of logical resources on a line board of the standby transmission line to support a plurality of optical transport unit (OTU) line rates.

6. The method according to claim 1, further comprising transmitting the target data stream using an initial transmission frequency band on one line while performing spectrum migration on another line.

7. The method according to claim 1, further comprising automatically triggering a defragmentation processing of spectrum resources when no frequency band is available in a transmission line to transmit a data stream.

8. The method according to claim 1, wherein after sending the target data stream on the first line, the method further comprises:
 performing frequency band migration of the target data stream on the first line while continuously transmitting the target data stream using the second line; and
 continuously transmitting the target data stream using the first line after adjusting the frequency band of the target data stream from the to-be-adjusted frequency band to the target frequency band.

9. A transmit end, comprising:
 a processor configured to adjust, on a first line, a frequency band for a target data stream from a to-be-adjusted frequency band to a target frequency band; and
 a transceiver coupled to the processor and configured to:
  obtain the target data stream carrying a sequence identifier of a data unit of the target data stream, wherein the sequence identifier indicates a transmission sequence of the data unit;
  send, on the first line, the target data stream using the to-be-adjusted frequency band;
  responsive to determining to defragment spectrum resources on the first line, switch transmission of the target data stream from the first line to a second line, wherein the first line and the second line are selected from a plurality of transmission lines available to the transmit end;
  use the first line or the second line to assist in spectrum defragmentation of a third line selected from the plurality of transmission lines;
  switch, after the processor adjusts the frequency band for the target data stream to the target frequency band, transmission of the target data stream from the second line to the first line by using the target frequency band to transmit the target data stream on the first line;
  record a sequence identifier X of a second data unit that is last sent on the second line when the target data stream is switched from the second line to the first line; and
  send, on the target frequency band of the first line, the target data stream starting from a third data unit whose sequence identifier is equal to X+1 using the target frequency band.

10. The transmit end according to claim 9, wherein the first line is a standby transmission line, and wherein the second line is an initial transmission line of the target data stream.

11. The transmit end according to claim 9, wherein the first line is an initial transmission line of the target data stream and the second line is a standby transmission line.

12. The transmit end according to claim 11, wherein the processor is further configured to configure the standby transmission line to have at least one data transmission parameter that is the same as that of the initial transmission line.

13. The transmit end according to claim 9, wherein at least one standby transmission line is preset between the transmit end and a receive end to assist in spectrum defragmentation of another transmission line.

14. The transmit end according to claim 9, wherein before the transmit end performs spectrum defragmentation of a transmission line, the processor is further configured to:
 determine a data transmission parameter of the transmission line; and
 configure another data transmission parameter of a standby transmission line to be the same as that of the transmission line.

15. A receive end, comprising:
 a processor configured to adjust, on a first line, a frequency band for a target data stream from a to-be-adjusted frequency band to a target frequency band; and
 a transceiver coupled to the processor and configured to:
  receive, on the first line, the target data stream using the to-be-adjusted frequency band, wherein the target data stream carries a sequence identifier of a data unit of the target data stream, and wherein the sequence identifier indicates a transmission sequence of the data unit of the target data stream;
  switch reception of the target data stream from the first line to a second line after spectrum defragmentation is started, wherein the first line and the second line are selected from a plurality of transmission lines;
  use the first line or the second line to assist in spectrum defragmentation of a third line selected from the plurality of transmission lines;
  switch, after the processor adjusts the frequency band for the target data stream to the target frequency band, reception of the target data stream from the second line to the first line;
  record a sequence identifier X of a second data unit that is most recently received on the second line when the target data stream is switched from the second line to the first line; and
  receive, on the target frequency band of the first line, the target data stream starting from a third data unit whose sequence identifier is equal to X+1 using the target frequency band.

16. The receive end according to claim 15, further comprising at least one tributary board, wherein after the spectrum defragmentation is started, the at least one tributary board is configured to:
 compare the second data unit that is most recently received on the second line with the third data unit that is received on the target frequency band of the first line; and
 complete lossless switching at boundaries of the second and third data units by reading the sequence identifier X of the second data unit and the sequence identifier X+1 of the third data unit.

17. The receive end according to claim 15, wherein the first line is an initial transmission line of the target data stream and the second line is a standby transmission line, or vice versa.

18. The receive end according to claim 17, wherein the standby transmission line has at least one data transmission parameter that is the same as that of the initial transmission line.

19. The receive end according to claim 15, wherein at least one standby transmission line is preset between the receive end and a transmit end to assist in spectrum defragmentation of another transmission line.

20. The receive end according to claim 15, wherein the transceiver is configured to receive, on the second line and based on the to-be-adjusted frequency band, the target data stream using the sequence identifier to ensure continuous data reception of the target data stream.

* * * * *